United States Patent
Hirose et al.

(10) Patent No.: US 8,245,191 B2
(45) Date of Patent: Aug. 14, 2012

(54) POLICY APPLICATION RULES FOR AUTOMATED CONFIGURATION OF SOFTWARE COMPONENTS

(75) Inventors: Shinichi Hirose, Tokyo (JP); Nirmal K. Mukhi, Ramsey, NJ (US); Yuichi Nakamura, Tokyo (JP); Fumiko Satoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 12/167,848

(22) Filed: Jul. 3, 2008

(65) Prior Publication Data

US 2010/0005451 A1    Jan. 7, 2010

(51) Int. Cl.
G06F 15/173 (2006.01)
G06F 9/44 (2006.01)
G06F 17/00 (2006.01)
H04L 29/06 (2006.01)
G06N 5/02 (2006.01)

(52) U.S. Cl. ........ 717/121; 709/223; 717/106; 717/117; 717/118; 717/120; 726/1; 706/47

(58) Field of Classification Search .................. None
See application file for complete search history.

(56) References Cited

U.S. PATENT DOCUMENTS

| 7,454,743 | B2* | 11/2008 | Fuchs | 717/118 |
|---|---|---|---|---|
| 7,496,890 | B2* | 2/2009 | Miller et al. | 717/121 |
| 7,707,278 | B2* | 4/2010 | Tafazolli et al. | 717/121 |
| 7,761,851 | B2* | 7/2010 | Bailey et al. | 717/121 |
| 7,917,889 | B2* | 3/2011 | Devarakonda et al. | 717/121 |
| 8,006,242 | B2* | 8/2011 | Block et al. | 717/121 |
| 8,079,015 | B2* | 12/2011 | Lind et al. | 717/120 |
| 2003/0200357 | A1* | 10/2003 | Yanosy | 709/328 |
| 2003/0200532 | A1* | 10/2003 | Gensel | 717/120 |
| 2003/0221184 | A1* | 11/2003 | Gunjal et al. | 717/118 |
| 2004/0019887 | A1* | 1/2004 | Taylor et al. | 717/118 |
| 2004/0098706 | A1* | 5/2004 | Khan et al. | 717/120 |
| 2006/0143144 | A1* | 6/2006 | Speeter et al. | 706/47 |

(Continued)

OTHER PUBLICATIONS

Bruce W. Weide et al., Software Component Engineering With Resolve/C++, vol. 2: The client's view, Jun. 5, 2007, [Retrieved on Mar. 28, 2012]. Retrieved from the internet: <URL: http://www.cse.ohio-state.edu/sce/book/SCE-V2.pdf> 252 Pages (1-252).*

(Continued)

*Primary Examiner* — Don Wong
*Assistant Examiner* — Anibal Rivera
(74) *Attorney, Agent, or Firm* — Scully, Scott, Murphy & Presser, P.C.; Gail H. Zarick, Esq.

(57) ABSTRACT

A method, system and article of manufacture are disclosed for configuring software application components. The method comprises the steps of developing a set of policy application rules, assembling unconfigured software components into one or more software applications, and applying said application rules to the unconfigured software components to configure said software components. In the preferred embodiment, the applying step includes the steps of passing the unconfigured software components to a policy rule engine, and using said policy rule engine to apply said application rules to the unconfigured software components to produce the configured components. In addition, the method may be done to resolve ambiguities in the software components. In particular, the application rules may be designed to resolve ambiguities in the application of these rules to the unconfigured software components. Also, each application rule preferably includes a condition, an application template, and a policy.

24 Claims, 6 Drawing Sheets

U.S. PATENT DOCUMENTS

| | | | |
|---|---|---|---|
| 2006/0212847 A1* | 9/2006 | Tarditi et al. | 717/117 |
| 2006/0224424 A1 | 10/2006 | Khusial et al. | |
| 2006/0236364 A1* | 10/2006 | Suni et al. | 726/1 |
| 2006/0265689 A1* | 11/2006 | Kuznetsov et al. | 717/117 |
| 2006/0288039 A1* | 12/2006 | Acevedo-Aviles et al. | 707/104.1 |
| 2007/0006278 A1* | 1/2007 | Ioan Avram et al. | 726/1 |
| 2007/0050756 A1* | 3/2007 | Paller | 717/117 |
| 2007/0089103 A1* | 4/2007 | Iborra et al. | 717/106 |
| 2007/0094204 A1* | 4/2007 | Huelsman et al. | 706/47 |
| 2007/0150429 A1* | 6/2007 | Huelsman et al. | 706/47 |
| 2007/0156618 A1* | 7/2007 | Meurs | 706/47 |
| 2007/0192706 A1 | 8/2007 | Bruce et al. | |
| 2008/0046582 A1 | 2/2008 | Beisiegel et al. | |
| 2008/0052503 A1 | 2/2008 | Beisiegel et al. | |
| 2008/0163334 A1* | 7/2008 | Perich et al. | 726/1 |
| 2008/0184200 A1* | 7/2008 | Burns et al. | 717/121 |
| 2008/0196082 A1* | 8/2008 | Sandoval et al. | 726/1 |
| 2008/0229278 A1* | 9/2008 | Liu et al. | 717/106 |
| 2008/0282147 A1* | 11/2008 | Schorr | 706/47 |
| 2008/0312986 A1* | 12/2008 | Braun et al. | 705/7 |
| 2009/0113387 A1* | 4/2009 | Ziegler | 717/106 |

OTHER PUBLICATIONS

Mei Hong et al., Software component composition based on ADL and Middleware, Apr. 2001, vol. 44 No. 2, [Retrieved on Mar. 28, 2012]. Retrieved from the internet: <URL: http://www.springerlink.com/content/f40276x173782731/fulltext.pdf> 16 Pages (137-151).*

Richard B. Kieburtz et al., A Software Enginerring Experiment in Software Component Generation, 1996 IEEE [Retrieved on Mar. 28, 2012]. Retrieved from the internet: <URL: http://dl.acm.org/citation.cfm?id=227842> 11 Pages (542-552).*

Ruiz, Jose L. et al., A Service Component Deployment Architecture for e-Banking, 22nd International Conference on Advanced Information Networking and Applications—Workshops, 3rd International IEEE Workshop on Service Oriented Architectures in Converging Networked Environments (SOCNE 08), IEEE Computer Society, 2008, pp. 1369-1374.

Curbera, Francisco, Component Contracts in Service-Oriented Architectures, IEEE Computer Society, 2007, pp. 74-80.

Ying, Liu et al., An Intelligent Service Composer for Business-level Service Composition, The 9th IEEE International Conference on E-Commerce Technology and the 4th IEEE International Conference on Enterprise Computing, E-Commerce and E-Services (CEC-EEE 2007), The Computer Society, 2007.

Zou, Zhile et al., Building Business Processes or Assembling Service Components: Reuse Services with BPEL4WS and SCA, Proceedings of the European Conference in Web Services (ECOWS'06) The Computer Society, 2006.

Sanz, Jorge L., et al., Business Services and Business Componentization: New Gaps Between Business and IT, IEEE International Conference on Service-Oriented Computing and Applications (SOCA'07), The Computer Society, 2007.

Gannon, D., et al., Building Grid Portal Applications From a Web Service Component Architecture, Proceedings of the IEEE, Mar. 2005, pp. 551-563, vol. 93, No. 3.

* cited by examiner

ARCHITECTURE OF RULE - BASED POLICY APPLICATION SYSTEM

Ruled-based Policy Application Process

Phase 1: Rule Development Phase (performed by IT policy experts)
Step 1: Policy experts within the developer's IT organization will develop policy application rules reflecting the best practices and IT policies of the organization.
Step 2: Rules are maintained on a continuous basis by policy experts Phase 2: Component Development Phase (performed by component developers and application assemblers)
Step 1: Components are created or assembled into applications by developers and assemblers
Step 2: Unconfigured component data is fed to the rule engine, which operates on rules to automatically produce configured components
Step 3: Configured components can be manually examined to verify policy application, and to apply additional policies
Step 4: Configured components are deployed into the production system

FIG. 3

```
<rule>
  <condition>'true'</conditon>
  <applicationTemplate>
    <location>rule:getPromotedServices()</location>
    <policy>reliablemessageing.exactlyonce</policy>
  </applicationTemplate>
<rule>
```

SAMPLE POLICY APPLICATION RULE

SCA COMPONENT ASSEMBLY TO ILLUSTRATE USE OF RULES TO RESOLVE AMBIGUOUS POLICY APPLICATION

```
<rule name="AtomicTxRule">
<condition>rule:isLowerLevelComposite()</conditon>
<applicationTemplate>
    <location>rule:getComponentsWithPromotedServices</location>
    <policy type="role">Tx_Creator</policy>
</applicationTemplate>
<applicationTemplate>
    <location>rule:getComponentsWithPromotedRefernces</location>
    <policy type="role">Tx_NonPropagator</policy>
</applicationTemplate>
<applicationTemplate>
    <location>rule:getInternalComponents()</location>
    <policy type="role">Tx_Propagator</policy>
</applicationTemplate>
<rule>
```

RULE TO CONFIGURE ATOMIC TRANSACTION PATTERN FOR COMPONENT ASSEMBLY

FIG. 6

```
<rule name="LocalTransctionAssembly">
<condition>//sca:composite/sca:component/sca:implementationComposite[sca:requires="managedTx.local"]</conditon>
<applicationTemplate>
    <location>//sca:composite/sca:component/sca:implementationComposite/sca:name</location>
    <polilcy type="rule">AtomicTxRule</policy>
</applicationTemplate>
<rule>
```

RULE TO TRIGGER AtomicTxRule BASED ON THE APPROPRIATE CONDITIONS

POLICY APPLICATION RULES FOR AUTOMATED CONFIGURATION OF SOFTWARE COMPONENTS

CROSS REFERENCE TO RELATED APPLICATION

This application is related to co-pending patent application Ser. No. 12/167,819, entitled "PATTERN-BASED POLICY APPLICATION MECHANISM FOR SCA", filed herewith, the disclosure of which is herein incorporated by reference in its entirety.

BACKGROUND OF THE INVENTION

1. Field of the Invention

This invention generally relates to component based software applications, and more specifically, to a policy configuration mechanism for applications that are comprised of an assembly of software components. Even more specifically, the preferred embodiment of the invention relates to such a mechanism that is very well suited for use with Service Component Architecture applications.

2. Background Art

The Service Component Architecture (SCA) is a specification put forward by software vendors with the objective of simplifying how organizations create and implement applications in a Service Oriented Architecture (SOA). SCA is included in the SOA Programming Model along with Service Data Objects (SDO), which allow heterogeneous data to be accessed and manipulated in a uniform manner. An SCA application is based on service components, which may be configured to provide services, consume other services, or both. These service components may be packaged together with import components and export components into SCA modules, and communicate with one another using SCA messages. SCA has become a standard method for building applications that are comprised of an assembly of software components. Configuring non-functional requirements of such applications (such as transactional or security requirements) is a tedious error-prone task since the individual components that make up the application have to be configured manually; this complexity increases with the number of components used to create the application. An additional problem is the resolution of the semantics of policy application to the component under certain situations: where the meaning of policy application is generally ambiguous.

In the past, componentized applications were comprised of a few components, and configuration was possible to do manually, even if it was somewhat tedious. Recent advances in the field such as the development of recursive component architectures like Service Component Architecture (SCA) and CORBA Component Model (CCM) have made it possible to create applications recursively, which is to say that each of the components used to build an application can itself be built using components. Such recursive component models have significantly increased the complexity of configuring non-functional properties in such applications. SCA provides high-level declarations of policies to simplify configuration, but even such declarations have to be applied manually. Model-Driven Development techniques have been used to simplify configuration of middleware systems. Model-driven techniques, however, need much more knowledge about the systems (through the development of an IT model) in order to make simplifications in configuration.

SUMMARY OF THE INVENTION

An object of this invention is to configure automatically software components using policy application rules.

Another object of the present invention is to provide a rule-based configuration system designed to simplify component configuration for complex component assemblies.

A further object of the invention is to provide a method for resolving ambiguities in policy application to software applications comprised of an assembly of components.

These and other objectives are attained with a method, system and article of manufacture for configuring software application components. The method comprises the steps of developing a set of policy application rules, assembling unconfigured software components into one or more software applications, and applying said application rules to the unconfigured software components to configure said software components. In the preferred embodiment, the applying step includes the steps of passing the unconfigured software components to a policy rule engine, and using said policy rule engine to apply said application rules to the unconfigured software components to produce the configured components.

In addition, the method may be done to resolve ambiguities in the software components. In particular, the application rules may be designed to resolve ambiguities in the application of these rules to the unconfigured software components. Also, each application rule preferably includes a condition, an application template, and a policy. The condition of each rule determines when the rule is applicable to the unconfigured software components. The application template results in application of a particular kind of policy to a particular part of one or more of the unconfigured components. The policy of each rule specifies the policy to be applied to one or more of the unconfigured components.

The preferred embodiment of the invention provides a method and system that configures software components automatically based on rules. Users of the system can define or modify the rules that drive the configuration; these can be based on the overall non-functional requirements of the application. In many practical situations, this leads to the configuration of the application being completed in a largely automated fashion, reducing the potential for errors and saving the time of the developer. Additionally, the rule-based mechanism can be applied to resolve ambiguities in policy application: the desired semantics can be encoded as a rule, which automatically applies the correct policy when used in the invention, eliminating the ambiguity.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
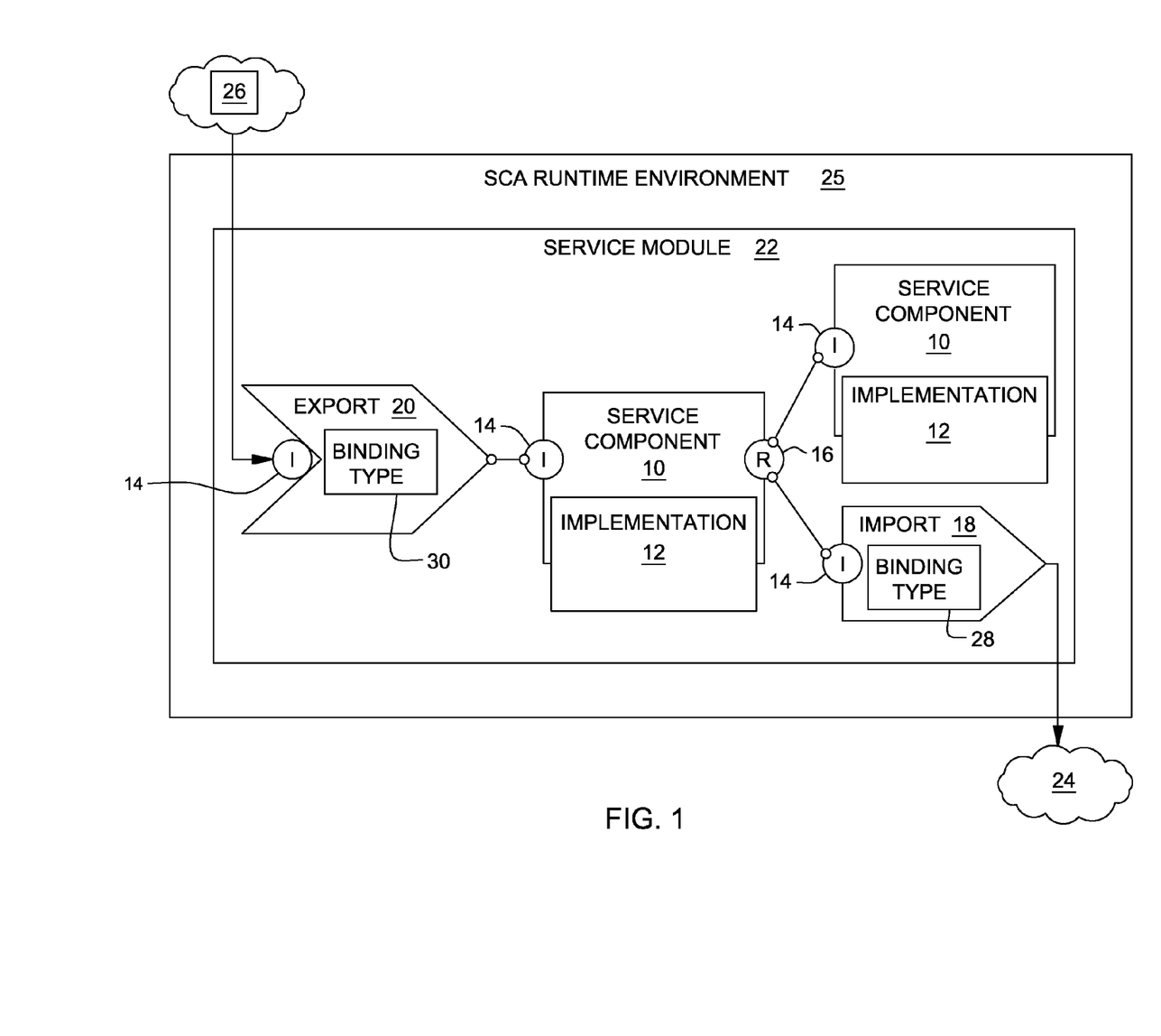
FIG. 1 is a schematic block diagram of Service Component Architecture.

Architectures that enable the creation of software applications through the assembly of components have become more complex, and some standards such as Service Component Architecture (SCA) allow recursive composition, wherein even individual components can recursively be created through the use of other components. FIG. 1 illustrates the Service Component Architecture. SCA is based on a service-oriented architecture and is designed to present business processes in a service-oriented manner. One primary objective of SCA is to separate business integration logic from implementation so that a developer can focus on integrating applications without worrying about the implementation details.

The building blocks in SCA are service components 10 which may be configured to provide services, consume other services, or both. Each service component 10 includes an implementation 12, which is hidden from the developer inside the component 10, and one or more interfaces 14, which define the component's inputs, outputs, and faults. A component 10 may also include one or more references 16, which identify the interface 14 of another service component 10 that a component requires or consumes. Because the service components 10 contain and hide an implementation 12, a developer can graphically assemble, or "wire," the components 10 together without knowledge of low-level implementation details.

The SCA service components 10 may be packaged together with import and export components 18, 20 into SCA modules 22, which run in an SCA runtime environment 25. The import and export components 18, 20 define a module's external interfaces or access points. For example, an import component 18 may be used to reference external services 24 outside of a module 22, so they can be called from within the module 22. An export component 20 allows service components 10 to provide their services to external clients 26. For the purposes of this description, these external services 24 and clients 26 are referred to as external components 24, 26.

The import and export components 18, 20 typically require binding information, which specifies the means of transporting data to and from the SCA modules. For example, an import binding type 28 refers to the specific way an external service 24 is bound to an import component 18. This includes the transport protocol used to communicate between the external service 24 and the import component 18. An export binding type 30 describes the specific way a module's services are made available to a client 26, including the communication protocol used to communicate with the client 26. For example, the import and export components 18, 20 may be used to access or provide services to external systems or services over various protocols, including but not limited to IIOP, HTTP, SOAP, and JMS. This can be accomplished by assigning, for example, a Web Service, EIS, JMS, or Stateless Session EJB binding type 28, 30 to an import or export component 18, 20.

The configuration of composite applications is non-trivial, since it involves application of various policies to individual components (or even parts of a component) to achieve the desired non-functional behavior for the application. Configuration of components involves the application of policies that drive middleware behavior to the development artifacts. Application of policy is often based on simple characteristics of the components; for example, the part of the component used by other components need to be configured to allow only secure access.

Component frameworks provide various mechanisms to assemble components into applications and to configure how software components operate. These configurations are used to tune the non-functional behavior of the component, and cover domains like security and transactionality. As an example, the SCA (Service Component Architecture) framework allows the developers to manage the security and transactional properties of SCA components using two mechanisms:

1. Policy intents, which are high-level declarations of the desired behavior of the component; these declarations do not refer to a particular implementation technology.

2. Policy sets, which are low-level declarations of the desired behavior and are associated with a particular technology.

This invention simplifies the developer's task to configure an application by providing a rule-based mechanism for doing so. Policies are often applied based on simple structural characteristics of the component assembly. For example, components that are open for use by business partners must have high-security associated with them. Using the preferred approach of the present invention, developers can define a rule that gets triggered by components that are open for use by partners, and specify with the rule the policy to be applied (in this case, one that applies high-security). This rule would be stored in a rule database. Once created, the rule resides in the database until modified or erased. When the developer creates components, he will then feed them to a rule engine, which automatically applies policies based on the rules that apply to the component. The transformed component is thus completely configured on the basis of the rules.

Figure 2:
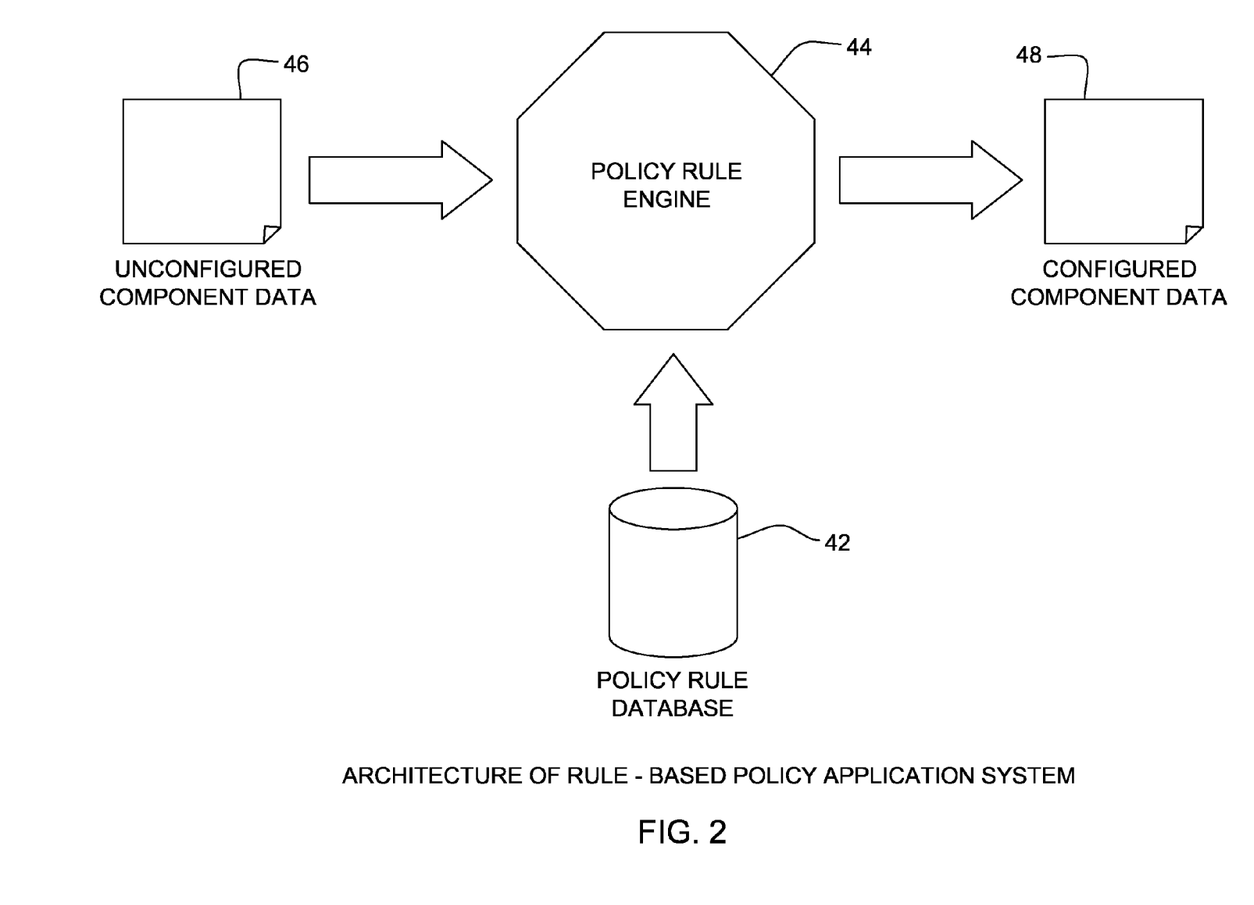
FIG. 2 shows the architecture of a Rule-based Policy application System in accordance with the present invention.

FIG. 2 shows the architecture of a preferred system. The system comprises a rule database 42, where rules are stored and a rule engine 44, which processes the rule and transforms an unconfigured component 46 into one that is configured 48 on the basis of the rules.

Rule-Based Policy Application Process

Figure 3:
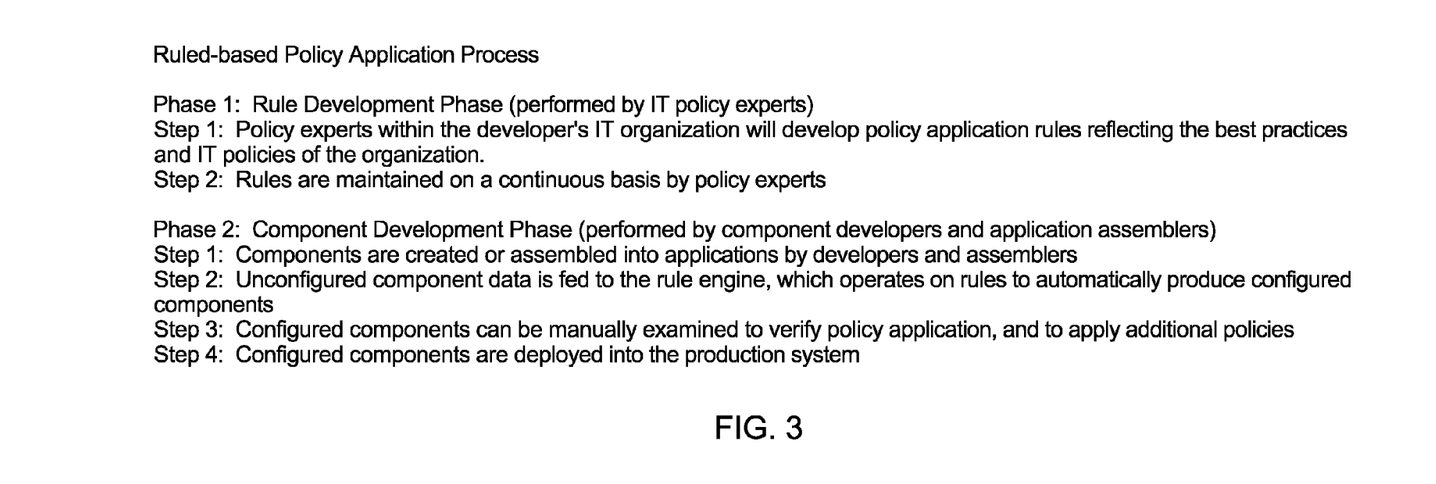
FIG. 3 describes the Rule-based policy application process.

With reference to FIG. 3, the preferred rule-based policy application process is comprised of two phases, each of which includes a sequence of steps. Phase I is the Rule Development Phase, performed by IT policy experts. This phase has two steps. In the first step, policy experts within the developer's IT organization develop policy application rules, reflecting the best practices and IT policies of the organization. In the second step, policy experts maintain these rules on a continuous basis.

Phase II is the Component Development Phase, performed by component developers and application assemblers. This phase has four steps. In the first step components are created or assembled into applications by developers and assemblers; and in the second step, unconfigured component data is fed to the rule engine, which operates on rules to automatically produce configured components. In the third step, configured components can be manually examined to verify policy application, and to apply additional policies; and in the fourth step, configured components are deployed into the production system.

Pattern Application Rules

Each pattern application rule includes a condition and an application template. The condition of each rule uses XPath syntax. XPath is a standard language used to express path expressions in XML documents. Since SCA component descriptions are XML documents, it is natural to use XPath to define such conditions. However, standard XPath is complex and it requires advanced knowledge to write non-trivial conditions. To make things easier for developers, the invention utilizes extension functions to XPath, allowing developers to refer to parts of an SCA component or an assembly without having to use complicated syntax.

Each application template results in application of a particular kind of policy to a particular part of the component assembly. The template thus identifies the policy being applied, and the location where it is to be applied. Rules themselves are serialized into XML so that they can be persisted in the rule database as XML documents.

Figure 4:
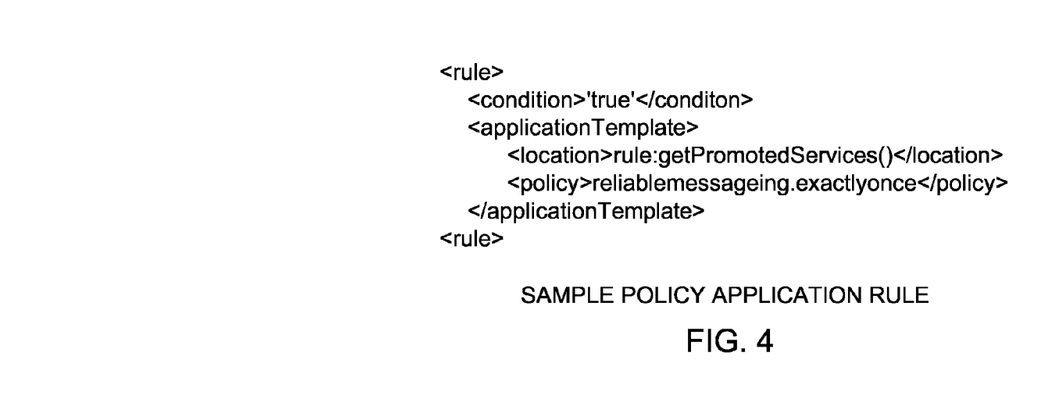
FIG. 4 gives a sample policy application rule.

FIG. 4 shows an example of a simple policy application rule. In this particular rule, the condition field is the XPath expression 'true', which means that this rule is applicable to all components; it is not constrained by the condition. The application template specifies the location as rule:getPromotedServices( ). This is an example of one of the XPath extensions to allow developers to refer to parts of the component assembly in a simple way. In this case, the function allows developers to refer to all component services that have been promoted, i.e., are open for use by business partners who use SCA or web services technology to communicate with this component. The policy portion of the rule specifies the policy to be applied. In this case, the policy is reliablemessaging.exactlyonce. This policy declares the requirement that messages must be delivered to the service exactly once. Given a requirement that all services open for use by business partners must require guaranteed message delivery, the developer automates the enforcement of the requirement through the use of this rule. The alternative would be for the developer to manually inspect all the components and associate the policy reliablemessaging.exactlyonce with the services that are promoted.

An additional use of this method is to resolve ambiguities in policy application in certain cases. To illustrate such a case, consider the SCA component assembly shown in FIG. 5.

Figure 5:
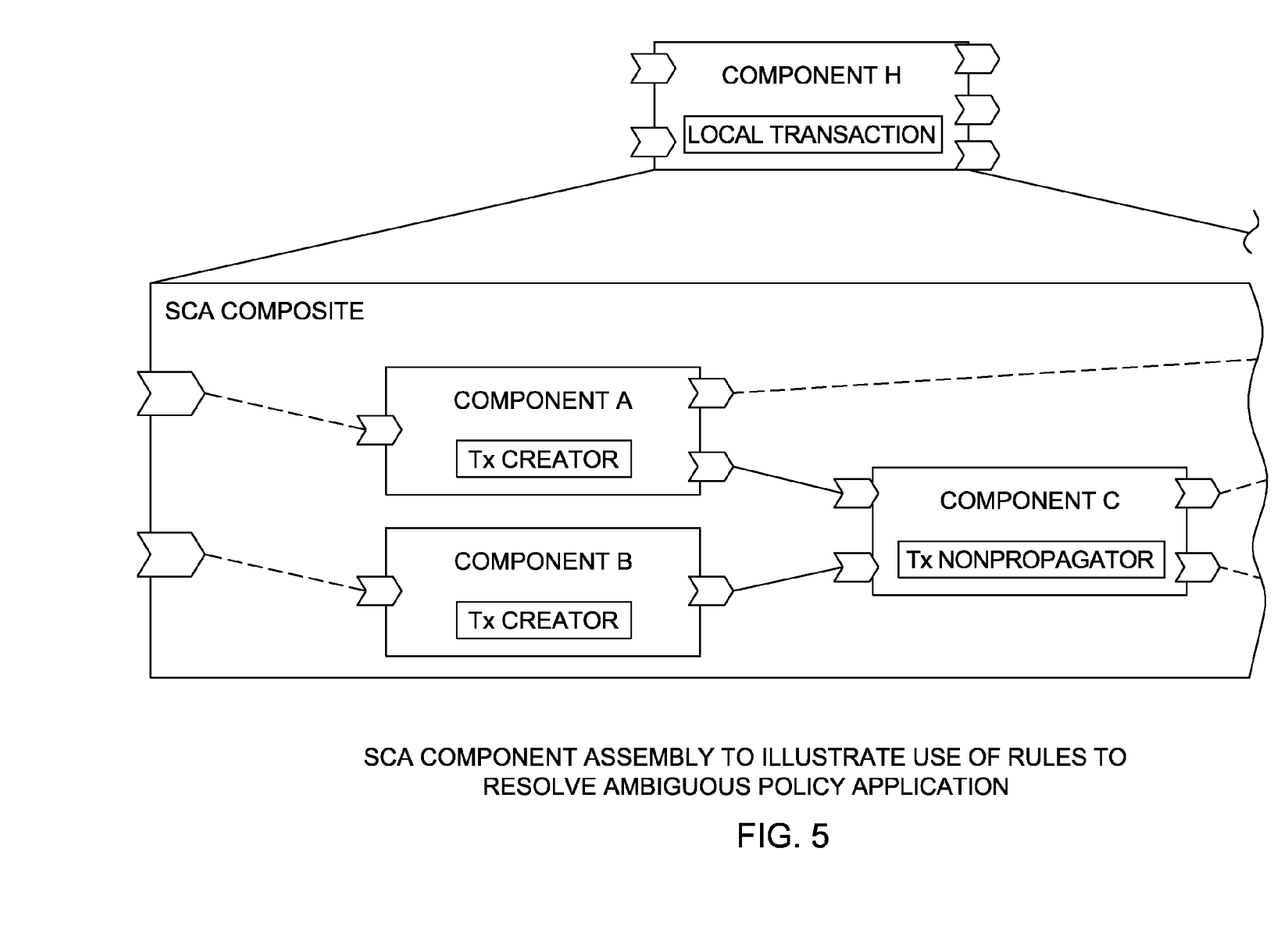
FIG. 5 shows an SCA component assembly to illustrate use of rules to resolve ambiguous policy application.

This figure shows an SCA component assembly comprising four components. The rectangles in the figure correspond to components. Chevron shapes attached to the left hand side of the components correspond to services provided by the component, and those on the right hand side of the component correspond to references (which are services used by the component). The smaller rectangles within each component correspond to policies that are to be associated with the components. In this assembly, Component H, providing two services and using three services, is in fact created through the composition of three other components, Components A, B and C. This composite acts as the implementation of component H. Such recursive assemblies are typical in the SCA framework. The dashed line in the figure correspond to services or references being promoted for use by other components (possibly by business partners). The solid lines are wires connecting references to a service providing the required functionality.

The ambiguity that the invention addresses arises because the semantics of policy application to a component are not well understood when the component is implemented by a composite, as in this case. Consider, as shown, that component H is required to run in a local transaction. Obviously, to meet this requirement, Components A, B and C have to be configured in an appropriate way, so as to reflect the local transaction requirement in Component H. Understanding how to configure A, B and C requires domain knowledge of how transactions are supported in SCA and in the environment within which the components will be deployed. One appropriate configuration is shown in FIG. 5. It uses the atomic transaction pattern as the policy for Components A, B and C, and associates roles with each of them. Use of the atomic transaction pattern is disclosed in copending application Ser. No. 12/167,819, for "Pattern-Based Policy Application Mechanism for SCA," filed herewith, the disclosure of which is herein incorporated by reference in its entirety. Components A and B are to assume the role of the transaction creator (Tx here is an abbreviation for the word Transaction). Component C is configured to be a transaction non-propagator. This means that A, B and C will run in a shared transaction which is created by either A or B. The transaction scope is limited to this composite (i.e. no other components participate).

Figure 6:
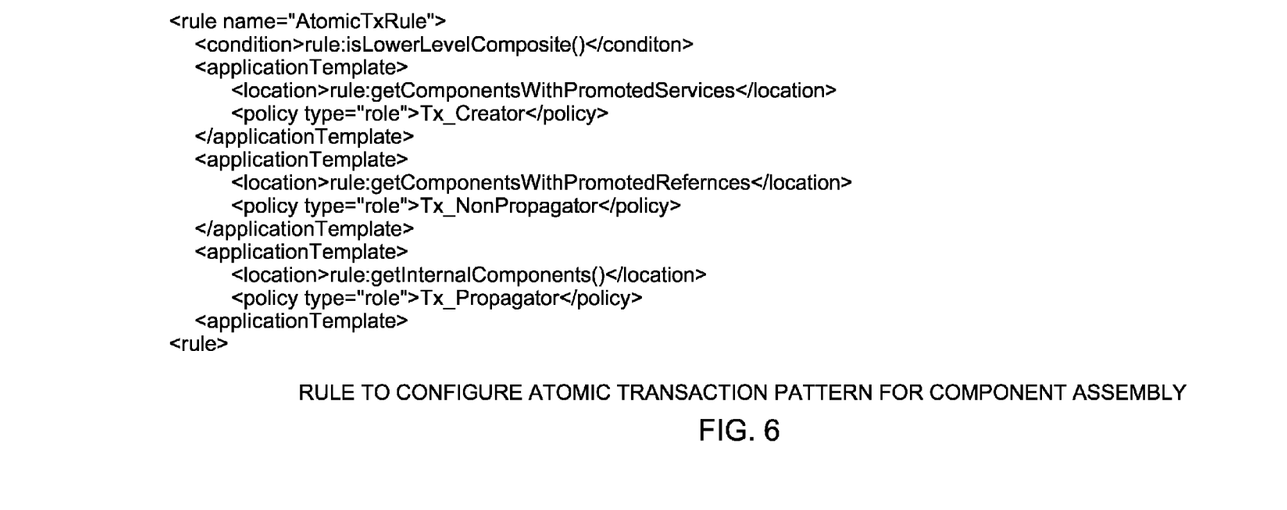
FIG. 6 gives a rule to configure an atomic transaction pattern for component assembly.

This is an acceptable solution for component H to provide the semantics of running in a local transaction. It is unrealistic to expect developers to acquire this knowledge and configure the components correctly. Using policy application rules turns out to be an extremely convenient solution here. As we detailed in the rule-based policy application process, transaction policy experts will develop a rule which will be applicable to all components running in a local transaction and implemented as a composite (this is what will be encoded into the rule's condition). The rule will apply roles to components based on whether they have promoted services or references: notice here that the components with promoted services (i.e., components A and B) are configured to be transaction creators. Components with promoted references (in this case, just Component C) are configured to be non-propagators. FIG. 6 shows the rule that automatically applies these policies.

Figure 7:
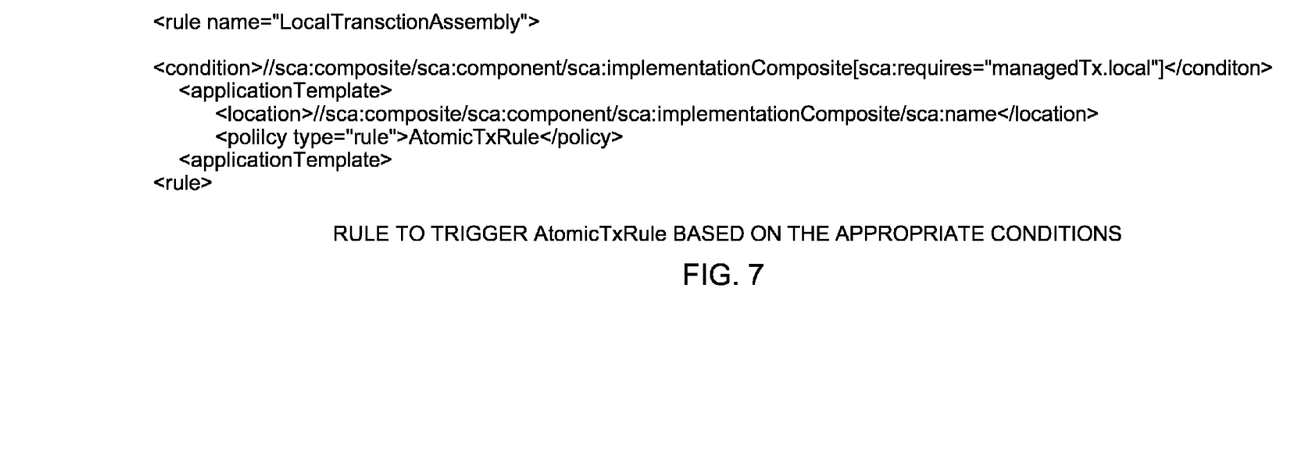
FIG. 7 gives a rule to trigger the atomic transaction rule of FIG. 6.

This rule is applicable for any component assembly that is used to build a high level component. As described above, this rule should be used only for those component assemblies that are used to build a component that is running in a local transaction. Thus, another rule is used to trigger this first rule. FIG. 7 shows the second rule needed.

As shown in FIG. 7, the condition checks if a component is implemented by a composite assembly, and is running in a local transaction (signified by the presence of the policy intent managedTx.local). If this is the case, the atomic transaction rule shown in FIG. 6 is applicable and is triggered.

The preferred embodiment of the invention, described above in detail, represents a significant advance in the science of configuration of composite applications. What has always been a manual and error-prone process can now be automated in many useful cases. Additionally, the preferred embodiment of the invention provides a way to formally encode best practices as rules stored in a database. The rule application process describes the steps for policy application and provides a method for using this technology in a practical scenario. Developers and IT policy experts using software components would benefit from this invention.

The invention will be generally implemented by a computer executing a sequence of program instructions for carrying out the invention. The sequence of program instructions may be embodied in a computer program product comprising media storing the program instructions.

As will be readily apparent to those skilled in the art, the present invention, or aspects of the invention, can be realized in hardware, software, or a combination of hardware and software. Any kind of computer/server system(s)—or other apparatus adapted for carrying out the functions described herein—is suited. A typical combination of hardware and software could be a general-purpose computer system with a computer program that, when loaded and executed, carries out the functions, and variations on the functions as described herein. Alternatively, a specific use computer, containing specialized hardware for carrying out one or more of the functional tasks of the invention, could be utilized.

Figure 8:
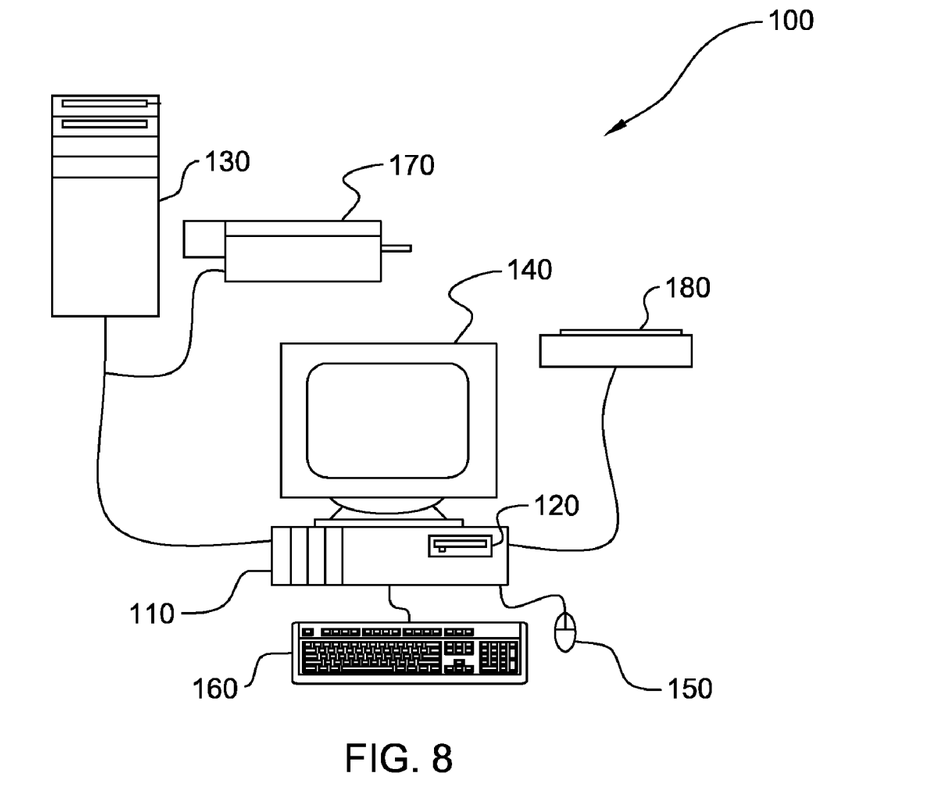
FIG. 8 shows a computer system that may be used to practice this invention.

A computer-based system 100 in which a method embodiment of the invention may be carried out is depicted in FIG. 8. The computer-based system 100 includes a processing unit 110, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 110 through a disc drive 120, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 110, as mentioned, or may be located on a remote system such as a server 130, coupled to processing unit 110, via a network interface such as an Ethernet interface. Monitor 140, mouse 150 and keyboard 160 are coupled to the processing unit 110, to provide user interaction. Scanner 180 and printer 170 are provided for document input and output. Printer 170 is shown coupled to the processing unit 110 via a network connection, but may be coupled directly to the processing unit. Scanner 180 is shown coupled to the processing unit 110 directly, but it should be understood that peripherals might be network coupled, or direct coupled without affecting the ability of the processing unit 110 to perform the method of the invention.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of configuring a plurality of unconfigured software application components, comprising the steps of:
    developing a set of policy application rules, each of the policy application rules including a condition and an application template, the condition of each of the policy application rules determining which ones of the software application components to which the each policy application rule is to be applied, and the application template of each of the policy application rules identifying a location to apply said each policy application rule;
    assembling the plurality of unconfigured software components into one or more software applications; and
    for each of the unconfigured software application components, using the conditions of the policy application rules to determine which one or more of the policy application rules are to be applied to said each unconfigured software application, and
    for each of the policy application rules that are to be applied to said each unconfigured software application component, using the application template of said each policy application rule to identify a location in said each unconfigured software application component where the each policy application rule is to be applied, and applying said each policy application rule at said identified location in said each unconfigured software application component to configure said software application component.

2. The method according to claim 1, wherein the applying step includes the steps of:
    passing the unconfigured software components to a policy rule engine; and
    using said policy rule engine to apply said application rules to the unconfigured software components to produce the configured components.

3. The method according to claim 1, wherein the applying step includes the step of applying the application rules to the unconfigured software components to resolve ambiguities in the application of the application rules to the unconfigured software components.

4. The method according to claim 3, wherein the rules apply roles to the unconfigured software components based on whether the unconfigured components have specified services or references.

5. The method according to claim 1, wherein some of the unconfigured software components trigger some of the application rules, and the applying step includes the step of applying each of the application rules to all of the unconfigured software components that trigger said each application rule.

6. The method according to claim 1, wherein each application rule further includes a policy that specifies the policy to be applied to one or more of the unconfigured components.

7. The method according to claim 6, wherein:
    each of the application rules specifies one or more characteristics; and
    the applying step includes the step of identifying, for each of the application rules, all of the unconfigured components that match the one or more characteristics specified by said each application rule.

8. The method according to claim 7, wherein the applying step includes the further step of applying each of the application rules to all of the unconfigured components that match the one or more characteristics specified by said each application rule.

9. A system for configuring a plurality of unconfigured software application components, comprising:
    a computer system including at least one processing unit and at least one memory unit, the computer system configured to function as:
    a policy rule database holding a set of policy application rules, each of the policy application rules including a condition and an application template, the condition of each of the policy application rules determining which ones of the software application components to which the each policy application rule is to be applied, and the application template of each of the policy application rules identifying a location to apply said each policy application rule; and a policy rule engine for receiving unconfigured software components;

assembling the plurality of unconfigured software components into one or more software application; and for each of the unconfigured software application components, using the conditions of the policy application rules to determine which one or more of the policy application rules are to be applied to said each unconfigured software application, and for each of the policy application rules that are to be applied to said each unconfigured software application component, using the application template of said each policy application rule to identify a location in said each unconfigured software application component where the each policy application rule is to be applied, and applying said each policy application rule from the policy rule database at said identified location in said each unconfigured software application component to configure said software application component.

10. The system according to claim 9, wherein the policy rule engine applies the application rules to the unconfigured software components to resolve ambiguities in the application of the application rules to the unconfigured software components.

11. The system according to claim 10, wherein the rules apply roles to the unconfigured software components based on whether the unconfigured components have specified services or references.

12. The system according to claim 9, wherein some of the unconfigured software components trigger some of the application rules, and the policy rule engine applies each of the application rules to all of the unconfigured software components that trigger said each application rule.

13. The system according to claim 9, wherein each application rule includes:
a policy that specifies the policy to be applied to one or more of the unconfigured components.

14. An article of manufacture comprising:
at least one computer usable device having computer readable program code logic tangibly embodied therein to execute a machine instruction in a processing unit for configuring a plurality of unconfigured software application components, said computer readable program code logic, when executing, performing the following steps:

receiving a set of policy application rules, each of the policy application rules including a condition and an application template, the condition of each of the policy application rules determining which ones of the software application components to which the each policy application rule is to be applied, and the application template of each of the policy application rules identifying a location to apply said each policy application rule;

assembling the plurality of unconfigured software components into one or more software applications; and for each of the unconfigured software application components, using the conditions of the policy application rules to determine which one or more of the policy application rules are to be applied to said each unconfigured software application, and for each of the policy application rules that are to be applied to said each unconfigured software application component, using the application template of said each policy application rule to identify a location in said each unconfigured software application component where the each policy application rule is to be applied, and applying said each policy application rule at said identified location in said each unconfigured software application component to configure said software application component.

15. The article of manufacture according to claim 14, wherein the applying step includes the step of applying the application rules to the unconfigured software components to resolve ambiguities in the application of the application rules to the unconfigured software components.

16. The article of manufacture according to claim 14, wherein some of the unconfigured software components trigger some of the application rules, and the applying step includes the step of applying each of the application rules to all of the unconfigured software components that trigger said each application rule.

17. The article of manufacture according to claim 14, wherein each application rules includes:
a policy that specifies the policy to be applied to one or more of the unconfigured components.

18. The article of manufacture according to claim 14, wherein:
each of the application rules specifies one or more characteristics; and
the applying step includes the step of applying each of the application rules to all of the unconfigured components that match the one or more characteristics specified by said each application rule.

19. A method of resolving ambiguities in software components, comprising the steps of:
developing a set of policy application rules, each of the policy application rules including a condition and an application template, the condition of each of the policy application rules determining which ones of the software application components to which the each policy application rule is to be applied, and the application template of each of the policy application rules identifying a location to apply said each policy application rule;

assembling a set of unconfigured software components into one or more software applications; and for each of the unconfigured software application components, using the conditions of the policy application rules to determine which one or more of the policy application rules are to be applied to said each unconfigured software application, and for each of the policy application rules that are to be applied to said each unconfigured software application component, using the application template of said each policy application rule to identify a location in said each unconfigured software application component where the each policy application rule is to be applied, and applying said each policy application rule at said identified location in said each unconfigured software application component to resolve ambiguities in the application of said policy application rules to unconfigured software components.

20. The method according to claim 19, wherein the applying step includes the steps of:
passing the unconfigured software components to a policy rule engine; and
using said policy rule engine to apply said application rules to the unconfigured software components to configure said software components.

21. The method according to claim 19, wherein some of the unconfigured software components trigger some of the application rules, and the applying step includes the step of applying each of the application rules to all of the unconfigured software components that trigger said each application rule.

22. The method according to claim 19, wherein each application rules includes:
  a policy that specifies the policy to be applied to one or more of the unconfigured components.

23. The method according to claim 19, wherein:
  each of the application rules specifies one or more characteristics; and
  the applying step includes the step of applying each of the application rules to all of the unconfigured components that match the one or more characteristics specified by said each application rule.

24. The method according to claim 1, wherein:
  the unconfigured software application components are configured to conform to a plurality of processes;
  the application template of each of the policy application rules identifies one of the plurality of policies and a location to apply said one of the policies;
  the using the application template of each policy application rule to identify a location in said each unconfigured software application component includes using the application template of each policy application rule to identify a location in said each unconfigured software application where the policy, identified by the application template of said each policy application rule, is to be applied; and
  the applying the policy application rule at said identified location includes applying the policy identified by the application template of said each policy application rule, at said identified location in said each unconfigured software application component.

* * * * *